Figure 1:
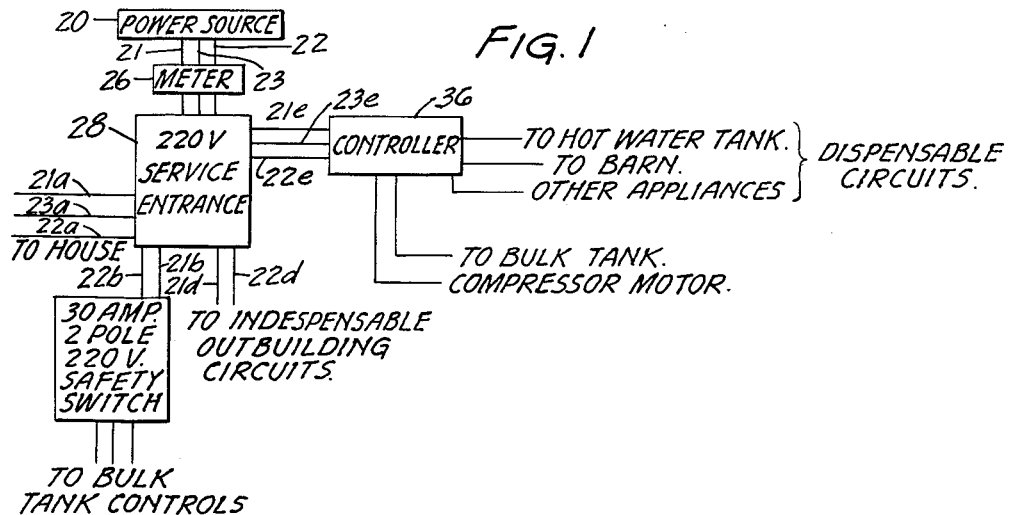

Nov. 27, 1962     R. E. ROONEY     3,066,227

DEVICE FOR CONTROLLING ELECTRICAL POWER DEMAND

Filed Oct. 12, 1959

INVENTOR
ROBERT E. ROONEY
BY David A. Roden
ATTORNEY

United States Patent Office 3,066,227
Patented Nov. 27, 1962

3,066,227
DEVICE FOR CONTROLLING ELECTRICAL POWER DEMAND
Robert E. Rooney, 4612 W. 4th St., Duluth 7, Minn.
Filed Oct. 12, 1959, Ser. No. 845,702
4 Claims. (Cl. 307—34)

This invention relates to devices for controlling the demand for electrical power by an individual facility, and particularly farm facilities.

It is well known that certain peakload periods of the day or night constitute a service problem for electrical power companies because they must either operate additional generating facilities to meet the demand, or if the demand exceeds the capacity of their own facilities, either purchase additional power from other companies to meet their own peak demand or put restrictions on peak demand load. Regardless of how supplied, the cost of the peak load power to the purchasing company is far in excess of their normal production cost per kilowatt.

In order to lessen the peakload demand, various devices have been used, e.g. relatively elaborate and expensive controllers which include various sensing means for dispensing with certain loads, and time clocks for devices such as electrical hot water heaters. The former, inter alia, have the disadvantage of being extremely expensive for use on the average farm, while the latter may not be used on certain devices, e.g. milk coolers and the like, where the local and federal health regulations prohibit or discourage their use.

The power companies themselves have discouraged consumer use of certain electrical devices by the imposition of a demand charge on the consumer for certain electrical motors. A specific instance of this is the demand charge that is imposed on direct expansion-type bulk milk tanks, which the power companies believe places the heavy "chore-time" load on their own facilities.

This invention provides a means for maintaining the electrically connected load of the individual consumer below a certain maximum without disrupting the flow of electrical current to necessary facilities. The invention has particular utility for farms and similar rural facilities wherein direct expansion type bulk milk tanks and the like are used, although as will be apparent as the description proceeds, the invention may be used in other environments.

It is, therefore, an object of this invention to provide a device to police and maintain the supply of electrical current to a preferred electrically operated facility at the expense of other less preferred electrical facilities.

It is another object to provide such a device which maintains the supply of electrical current to the electrically operated refrigeration means of a direct expansion bulk milk tank in response to a temperature sensing thermostatic switch which is closed by a rise in the milk temperature in the bulk tank to a predetermined maximum.

Additional advantages are prolongation of the refrigerator units' electrical motor life by assuring full initial voltage thereto, and assuring positive control to the power supplier of the potential connected load at any given time.

The manner in which my device may be easily installed and used to limit in an economical way the electrical power demand from a given circuit, and the manner in which the foregoing and other objectives and advantages are accomplished will be apparent from the following description, taken in conjunction with the accompanying drawings, in which:

FIGURE 1 schematically illustrates a typical installation of my novel device in an individual rural electrical wiring system.

Figure 2:
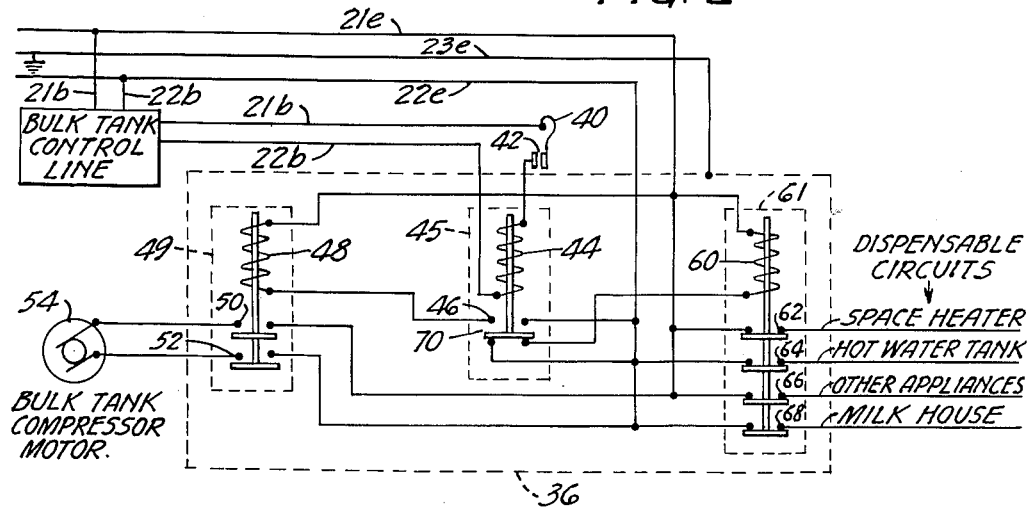

FIGURE 2 diagrammatically illustrates my device in its presently preferred form when placed in a wiring layout such as that illustrated in FIGURE 1.

Figure 3:
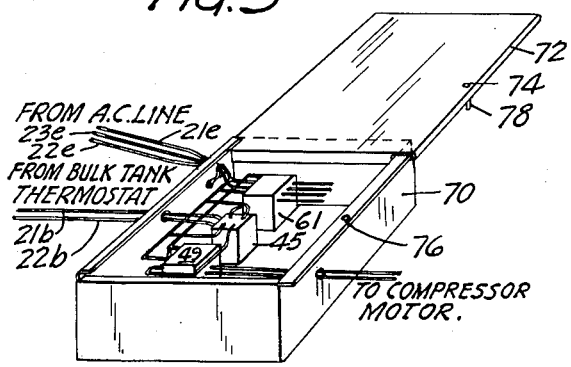

FIGURE 3 is a perspective view showing the elements of my device mounted and connected in a sealable metal box, ready to be punched for necessary connections to outside electrical wiring and ready to be mounted on a suitable pole, wall or other convenient location.

Referring to FIGURE 1, a typical farm 220 v. electrical power distribution system is illustrated wherein the utility company's transmission lines and transformer are indicated as power source 20. The service wires 21 and 22 and neutral or ground wire 23 run through the meter 26 and into the service entrance box 28. The 220 volt house power is supplied by conductor wires 21a, 22a, and ground wire 23a from the service entrance box. 21b and 22b are conductors to provide 220 volt current to the bulk tank controls and are preferably provided with a 30 amp., 2 pole, 220 volt safety switch 30. Lines 21d and 22d provide electrical power to any indispensable outbuilding circuits, such as yard lights and milking machines. Lines 21e, 22e, and 23e conduct electrical power from the service entrance box to the bulk tank compressor motor and to a number of dispensable electrical power consuming circuits, such as the hot water tank, barn cleaner and other appliances. Interposed between these latter circuits and the service entrance box is my control unit 36.

The manner in which my control unit functions will be more readily understood with reference to FIGURE 2. The bulk milk tank (not shown) contains a condition responsive means or temperature sensing means such as the pressure thermostat 40. When the temperature of the milk reaches a predetermined level, the thermostat actuates and closes the thermostatic switch 42, completing the circuit through relay coil 44 of the relay 45. The energization of relay coil 44 causes the closing of switch 46, thus completing the circuitry for relay coil 48 of the relay 49. The energization of relay coil 48 causes the closing of switches 50 and 52, allowing electrical current to flow to the bulk tank compressor motor 54. As shown in FIGURE 2, relay coil 60 of relay 61 is normally energized, maintaining switches 62, 64, 66, and 68 in the closed position, which allows the electrical current to flow into various dispensable circuits. However, the closing of the thermostatically controlled switch 42 and energization of the coil 44 opens the switch 70, thus disrupting the flow of electrical energy through the coil 60 and opening the switches 62, 64 and 66, and 68 so that electrical power cannot be consumed in these dispensable circuits while the bulk tank compressor motor 54 is running. When the milk is cooled to a predetermined level, the condition responsive switch 42 is again opened, disconnecting the circuitry to the motor 54 and reestablishing the circuitry through switches 62, 64, 66 and 68 to the various dispensable circuits.

FIGURE 3 illustrates the relays 45, 49 and 61 mounted and interconnected in a metal box 70 having a sliding cover 72 approximately provided with an opening on the edge thereof which will be juxtapositioned over a similar opening 76 in the flange of the box when the cover is in the closed position. In the latter position a lock or seal 78 may be placed through both openings to provide a sealed and hence essentially tamper-proof unit. The exterior face of the unit opposite the cover side preferably is provided with pegs or studs to insure proper air circulation behind the unit in case it is mounted on a flat surface such as the milkhouse wall.

In the above-described controller, the relays 49 and 61 are preferably heavy-duty relays, while the relay 45 is a contactor type relay providing positive control on the bulk tank with a coil consuming only small wattage.

If desired, selected electrical power consuming devices in the house circuit may also be temporarily disconnected when the bulk tank compressor motor is running. For example, part of the dispensable connected load through relay 61 may be a step down transformer having low voltage lines connected to low voltage switches in the portion of the house circuit that provides electrical power to the hot water tank and clothes dryer. As well understood by those skilled in the art, the connections are so made that the above named appliances are disconnected from the house circuit when the dispensable load is disconnected by relay 61.

While I have described the use of my device in a circuit wherein the indispensable circuit is connected to the bulk milk tank compressor motor, it is readily apparent that the device would prove beneficial to the power companies when utilized in other circuits of a metered facility—i.e. to temporarily disconnect the electric hot water heater and electric clothes dryer in the house when the electric range is in use.

Similarly, my device may be used to make practical the use of existing electrical wiring rated as 60 amp. service. For example, in a doctor's office, wherein the connecting of temporarily indispensable units, such as the surgical lamp and electrocautery machine used for minor office surgery would exceed the rated service and blow fuses if such devices as the diathermy machine or infrared lamp were in simultaneous use, my control device may be connected into the circuitry in a manner that will prevent accidentally exceeding the rating for the total connected load.

Having described my novel device in its preferred form, it is to be distinctly understood that this is by way of example and not by way of limitation and various changes may be made as are obvious to those skilled in the art without departing from the spirit and scope of my invention as set forth in the appended claims.

What I claim is as follows:

1. In an electrical system having a power source and comprising more than one circuit, each of said circuits having a switch, means for insuring that one of said circuits may receive at least a certain minimum amount of power less than a maximum amount available from said source, said means comprising a first relay normally energized to provide power to a circuit other than said one circuit, and a second normally deenergized relay that is energized in response to sensing means whereby said first relay is deenergized to disconnect circuits other than said one circuit, and a third relay, said third relay being simultaneously energized to connect said one circuit.

2. In an electrical system having a power source and at least two circuits, at least one of which is dispensable and at least one of which is indispensable, a controller unit comprising three relays and associated switches, one relay being normally energized and two relays being normally deenergized, and one of said normally deenergized relays being connected to a sensing means control switch, said relays and associated switches being so disposed in said circuits that said normally energized relay maintains its associated switch in the closed position, allowing power to be drawn by a dispensable load circuit, that the first of said two normally deenergized relays is energized by closure of the said sensing means control switch, thereby simultaneously deenergizing said normally energized relay and energizing the second of said normally deenergized relays whereby the switch associated with said second normally deenergized relay is closed to connect an indispensable circuit and whereby the switch associated with said normally energized relay is simultaneously opened.

3. In an electrical system having a power source and at least two circuits, at least one of which is dispensable and at least one of which is indispensable, an indispensable circuit being connected to a compressor motor of a device having a thermostat; three interconnected relays and associated switches, and one thermostatically controlled switch, the first of said three relays being normally energized whereby an associated switch is closed connecting a dispensable load, a second normally deenergized relay, the said second relay being energized upon the closure of said thermostatically controlled switch, the energization of the said second relay simultaneously opening an associated switch whereby the said first relay is deenergized and closing an associated switch allowing the energization of the third of said relays, energization of said third relay closing a switch whereby said compressor motor is connected.

4. In an electrical system having a power source and at least two circuits, at least one of which is dispensable and one of which is indispensable, the latter being operated intermittently by a sensing means, a controller unit for limiting peak load demand which comprises a first relay and normally closed first relay switch being so connected to said power source as to connect a dispensable circuit, a second relay and second relay switch being so connected to said power source as to permit power consumption by said indispensable circuit when said second relay switch is closed, and a third relay and third relay switch, said third relay being capable of controllable activation by said sensing means whereby said first relay switch is opened and said second relay switch is closed to permit power consumption preferentially by said indispensable circuit.

References Cited in the file of this patent

UNITED STATES PATENTS

| | | |
|---|---|---|
| 1,941,863 | Johnson | Jan. 2, 1934 |
| 2,266,152 | Biebel | Dec. 16, 1941 |
| 2,874,310 | Young | Feb. 17, 1959 |
| 2,923,831 | Wallace | Feb. 2, 1960 |